United States Patent
Mathur et al.

(10) Patent No.: US 8,989,185 B2
(45) Date of Patent: Mar. 24, 2015

(54) METHOD AND APPARATUS FOR CONVERTING A MULTICAST SESSION TO A UNICAST SESSION

(75) Inventors: Saurabh Mathur, Monmouth Junction, NJ (US); Ishan Uday Mandrekar, Monmouth Junction, NJ (US); Dekai Li, San Jose, CA (US)

(73) Assignee: Thomson Licensing, Issy les Moulineaux (FR)

( * ) Notice: Subject to any disclaimer, the term of this patent is extended or adjusted under 35 U.S.C. 154(b) by 114 days.

(21) Appl. No.: 13/812,974

(22) PCT Filed: Aug. 5, 2010

(86) PCT No.: PCT/US2010/044560
§ 371 (c)(1),
(2), (4) Date: Jan. 29, 2013

(87) PCT Pub. No.: WO2012/018337
PCT Pub. Date: Feb. 9, 2012

(65) Prior Publication Data
US 2013/0128889 A1    May 23, 2013

(51) Int. Cl.
*H04L 12/28* (2006.01)
*H04L 29/08* (2006.01)
*H04L 12/18* (2006.01)

(52) U.S. Cl.
CPC ...... *H04L 29/08639* (2013.01); *H04L 12/1877* (2013.01); *H04L 12/189* (2013.01); *H04L 67/148* (2013.01)
USPC ........... 370/390; 370/401; 370/392; 370/394; 370/412

(58) Field of Classification Search
USPC .......................... 370/401, 390, 392, 394, 412
See application file for complete search history.

(56) References Cited

U.S. PATENT DOCUMENTS

| | | | | |
|---|---|---|---|---|
| 7,561,570 B2* | 7/2009 | Kondo | | 370/392 |
| 7,944,946 B2* | 5/2011 | Zhou et al. | | 370/474 |
| 2005/0259682 A1* | 11/2005 | Yosef et al. | | 370/468 |
| 2008/0253322 A1* | 10/2008 | So et al. | | 370/329 |

FOREIGN PATENT DOCUMENTS

| | | |
|---|---|---|
| GB | 2418574 | 3/2006 |
| WO | WO2007122503 | 11/2007 |
| WO | WO2009129367 | 10/2009 |

OTHER PUBLICATIONS

Stephens et al., "Joint Proposal: High Throughput Extension to the 802.11", IEEE, Piscataway, NJ, Feb. 1, 2006.
Search Report dated Mar. 24, 2011.

* cited by examiner

*Primary Examiner* — Duc C Ho
(74) *Attorney, Agent, or Firm* — Robert D. Shedd; Jerome G. Schaefer

(57) ABSTRACT

A method and apparatus are described including a data packet having a data packet header, storing the received data packet as shared payload, determining if the received data packet is a first data packet, initializing a sequence starting number responsive to the determination, generating a new data packet header, calculating a sequence number for the received data packet using the sequence starting number, inserting the new sequence number into the new data packet header, unicasting the new data packet header and the shared payload to a plurality of client devices.

9 Claims, 5 Drawing Sheets

METHOD AND APPARATUS FOR CONVERTING A MULTICAST SESSION TO A UNICAST SESSION

This application claims the benefit, under 35 U.S.C. §365 of International Application PCT/US2010/044560, filed Aug. 5, 2010, which was published in accordance with PCT Article 21(2) on Feb. 9, 2012 in English.

FIELD OF THE INVENTION

The present invention relates to communications over a network and, in particular, to the conversion of a multicast session to a unicast session.

BACKGROUND OF THE INVENTION

In multicast and broadcast applications, data are transmitted from a server to multiple receivers over wired and/or wireless networks. A multicast system as used herein is a system in which a server transmits the same data to multiple receivers simultaneously, where the receivers form a subset of all the receivers up to and including all of the receivers. Instead of making a copy of the data for each receiver, in multicast a single copy of the data is transmitted. A broadcast system is a system in which a server transmits the same data to all of the receivers simultaneously. That is, a multicast system by definition can include a broadcast system.

Multicast is, however, unable to recover packet errors. This problem is more acute in certain types of networks (e.g. wireless networks). In such cases unicasting is better suited for data transmission as most of the link layer protocols use retransmissions to recover errors in data packet transmission. An example scenario would be an IPTV service, which may multicast multimedia (video, audio) data to multiple receivers located in customer premises. However, inside the customer premises, further distribution of this content may be required. For example, distribution of IPTV content from an IPTV gateway device to a set top box (STB), a desktop personal computer (PC), a dual-mode smart phone, a client, a client device, a mobile device, a mobile terminal, an end device, a terminal device, a laptop or any other equivalent device. In many cases this distribution occurs over a wireless network (e.g. IEEE 802.11a/b/g/n) which is lossy in nature. As a result data packets will invariably be lost during transmission over the wireless network. If multicast is used for data transmission over the lossy network, packet losses will be more severe since there is no link layer packet recovery that is used to correct these errors. However, if unicasting is used for transmission over the lossy wireless network, because of the link layer retransmissions, the performance of the network in terms of packet losses improves.

It would be beneficial to convert a multicast session to a unicast session in the above situation. Multicast-to-unicast conversions are fraught with pitfalls including the necessity for increased memory to maintain multiple copies of the data.

The protocols used for multicasting data over IP networks have been enhanced to support reliability. IETF RFC 2887 describes ACK and NACK based mechanisms to enable reliable data transmissions. Other techniques use Forward Error Correcting Codes (FEC) and Automatic Repeat Request (ARQ). Use of an ACK/NACK mechanism requires that the sender of the data be aware of the ACK/NACK mechanism in order to correct for errors. Similarly, for FEC based solutions, the sender needs to create the additional FEC packets in order to enable data packet recovery at the receivers. Yet another mechanism changes the link layer header of multicast packets from multicast IP address to unicast IP address. This scheme does not work in the case where there are one or more routers between the wireless receiver and the link layer multicast-to-unicast converter.

SUMMARY OF THE INVENTION

In recent years, there has been tremendous growth in the delivery of multimedia content via IP networks. For many applications, it is more efficient to deliver the content via multicast in order to avoid the overhead in duplication of the multimedia content over multiple IP connections. Example applications include broadcast video which is viewed by many users simultaneously. However, multicast is not the best method of content delivery in terms of error recovery. Unicasting performs better in terms of error recovery. Most of the link layer protocols use retransmission to recover errors in data packet transmission. In the present invention, a mechanism is described to convert a multicast session to a unicast session in order to improve the error recovery of the data.

As used herein data and content include, but are not limited to, multimedia content, audio content, video content, files of data, etc. or any combination thereof. Data is typically formatted for transmission over a medium whether that medium is wired line or wireless. Data may be formatted or aggregated or separated (segregated) into packets or frames. Typically, packets of data are aggregated into frames. As used herein, however, the terms packet and frame may be used interchangeably since both terms relate to the formatting of data for transmission (communication, forwarding) over a medium.

The present invention does not require the sender to be aware of reliability requirements or to create any FEC packets and also works in the case when there are one or more routers between the wireless receiver and the multicast-to-unicast converter.

A method and apparatus are described including receiving a data packet having a data packet header, storing the received data packet as shared payload, determining if the received data packet is a first data packet, initializing a sequence starting number responsive to the determination, generating a new data packet header, calculating a sequence number for the received data packet using the sequence starting number, inserting the new sequence number into the new data packet header, unicasting the new data packet header and the shared payload to a plurality of client devices.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

The multicast-to-unicast conversion is done at the transport layer of the OSI network model. Multicast IP data packets are intercepted at a proxy and converted to unicast data packets and then sent (communicated, forwarded, transmitted) to the destination device. The destination device is unaware of the multicast stream and requests a unicast feed of the desired content from the proxy. In response, the proxy subscribes to a multicast stream of the requested content and then forwards the content as a unicast stream to the destination device. One embodiment of the present invention uses Real Time Streaming Protocol (RTSP) to make the request to the proxy (using a control channel) and Real Time Transport Protocol (RTP) to transmit the content (using a data channel). The proxy runs (is executed) on a home gateway which receives multiple multicast feeds from a head-end server in the carrier's distribution network. Each multicast stream may carry video content for a unique TV channel. Multicasting this data helps to conserve bandwidth on the carrier's network, which is assumed to be more resilient to packet errors. The home gateway provides wireless connectivity to various devices within the home using technologies defined in the IEEE 802.11 base standard and various amendments such as a, b, g, n. The use of unlicensed frequency spectrum, the wireless channel characteristics and the MAC algorithm used to arbitrate access to the shared wireless medium makes this in-home distribution network extremely susceptible to packet errors. The end devices use RTSP protocol to request content pertaining to a particular TV channel from the proxy. The proxy, in turn, receives the requested content of the corresponding multicast stream and converts it to a unicast stream directed towards the requesting device. This multicast-to-unicast conversion provides a certain degree of reliability to the transmission by leveraging the link layer error recovery mechanism provided by the IEEE 802.11 base standard.

Figure 1:
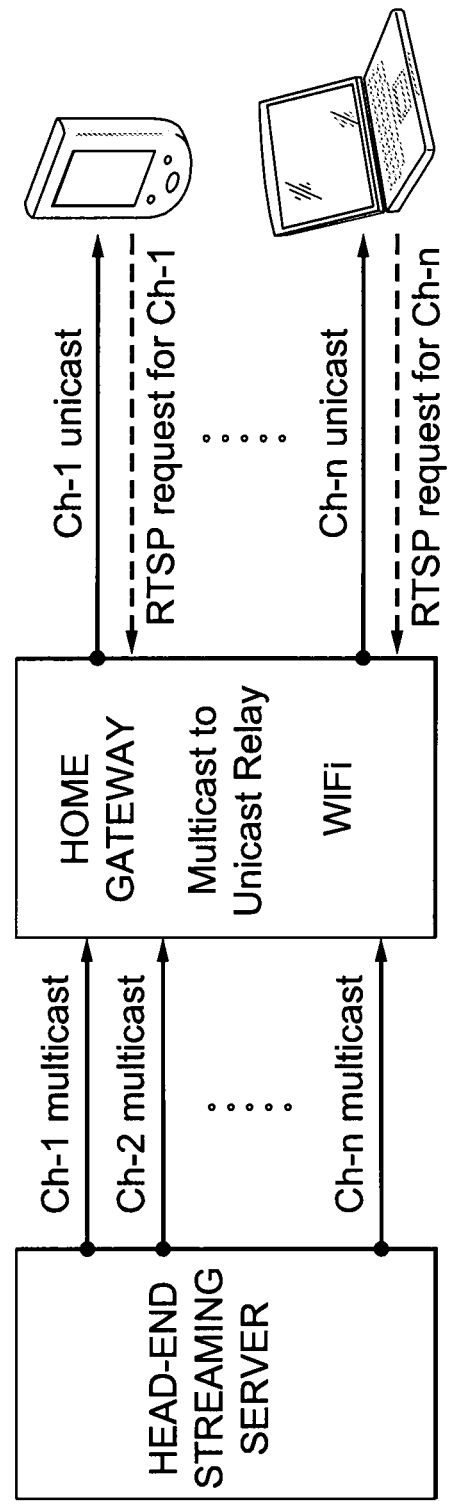
FIG. 1 is a schematic diagram of a conceptual system setup for this exemplary embodiment of the present invention.

FIG. 1 is a schematic diagram of a conceptual system setup for this exemplary embodiment of the present invention. In FIG. 1 a head-end streaming server is in the carrier's network. The carrier's network may be wired line (e.g., cable) or wireless (e.g., satellite). The laptop and mobile phone represent any of a variety of end devices that can be used and controlled by a user in order to receive multimedia data. Such an end device makes a request for content desired by the user to a proxy in a home gateway. The home gateway is in the customer's premises as are any of the plurality of possible end devices. The dashed lines indicate the users' requests to the proxy for the desired content. The media over which the home gateway and end devices operate is assumed to be wireless. The proxy in the home gateway forwards the users' requests to the head-end streaming server (not shown). The head-end streaming server then multicasts various channel content to the home gateway. The home gateway then converts the received content to unicast streams and forwards the requested content to the end devices.

The manner in which the multicast-to-unicast stream transformation (conversion) occurs is likely to impact the performance and scalability of the entire system. In one embodiment of the method of the present invention, multicast data packets are passed through the entire network protocol stack and received in the proxy application executing in the user space of the operating system running on the home gateway. These data packets are then individually transmitted over unicast channels to one or more destination (end) devices.

Figure 2:
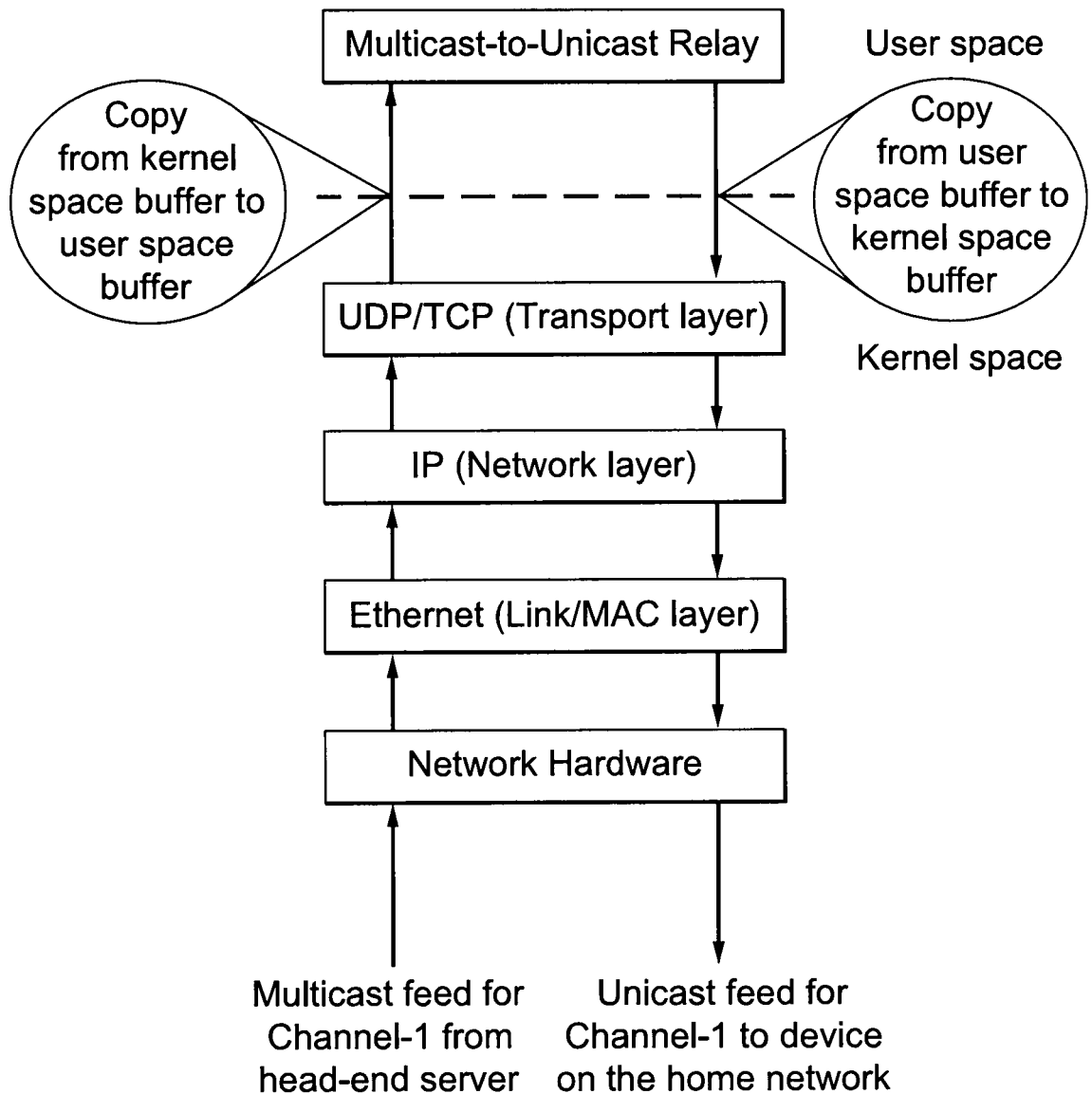
FIG. 2 is a prior art embodiment of a multicast-to-unicast conversion.

FIG. 2 is a prior art embodiment of a multicast-to-unicast conversion. As can be seen from FIG. 2, the data packets make multiple passes through the protocol stack. Each time the data packets traverse the stack, there are multiple copies being made resulting in memory and significant processor usage on the home gateway device. The data is relayed in unicast after the multicast-to-unicast conversion, which occurs in the user space. The kernel space (part of the operating system) includes the bottom four layers of the Open Systems Interconnection (OSI) model protocol stack—specifically the transport layer, the network layer, the (data) link/MAC layer and the physical layer. The network hardware represents the physical layer (layer 1). The Ethernet represents the (data) link/MAC layer (layer 2). The IP represents the network layer (layer 3). User Datagram Protocol (UDP)/Transmission Control Protocol (TCP) represent the transport layer (layer 4).

A resource efficient embodiment of this process includes implementing the multicast-to-unicast conversion in the kernel space. Data packets are intercepted in the kernel protocol stack just before the data packets are handed to the user space. Their headers are replaced and the data packets are then sent out on individual unicast channels. This saves unnecessary data copying from the kernel space to the user space, which can make the process more efficient in terms of the speed and volume of the conversion it is able to handle.

Figure 3:
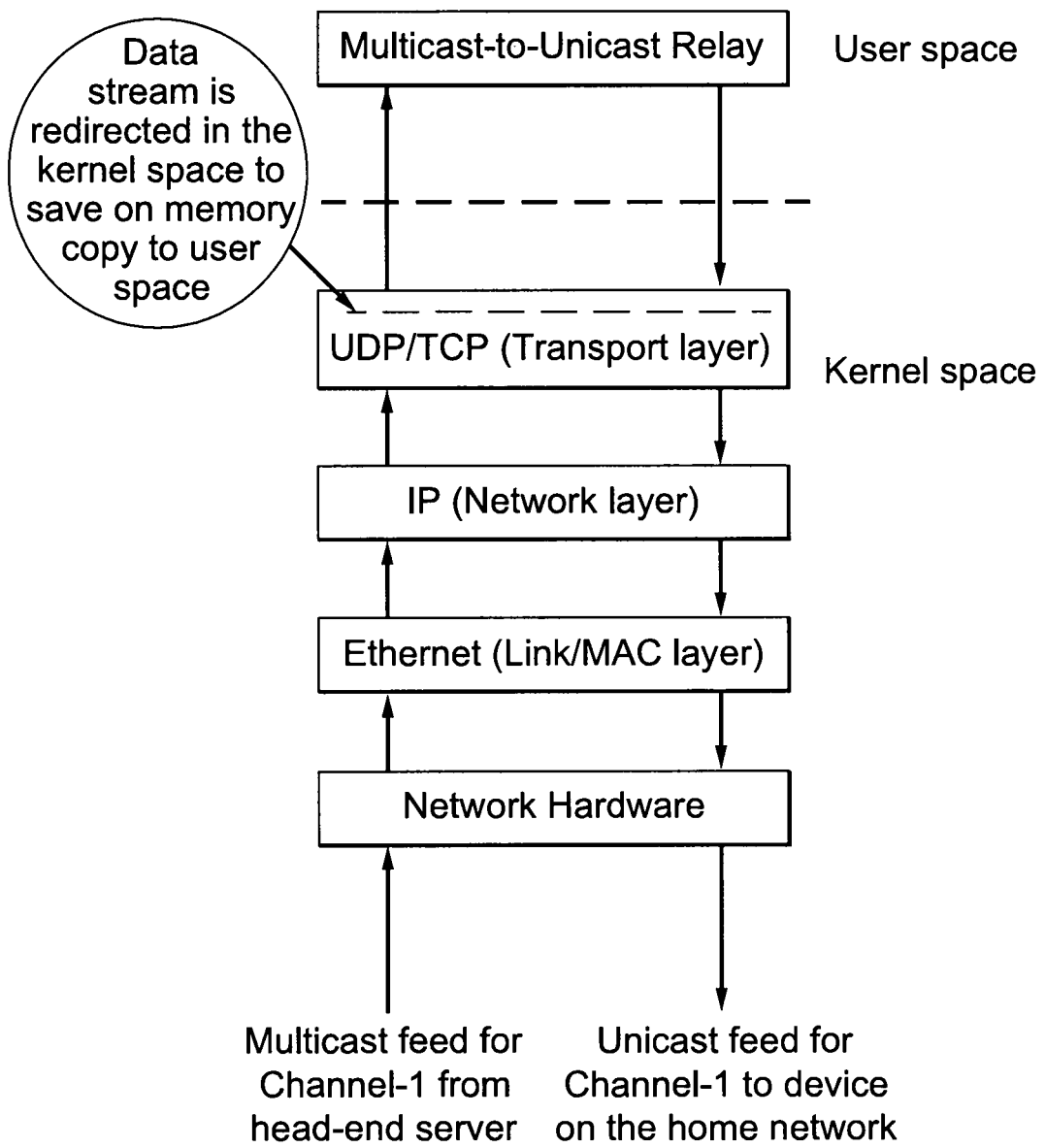
FIG. 3 is an improved embodiment of a multicast-to-unicast conversion in accordance with the principles of the present invention.

FIG. 3 is an improved embodiment of a multicast-to-unicast conversion in accordance with the principles of the present invention. As can be seen in FIG. 3, this process requires a single kernel buffer copy of the data packets as opposed to the earlier described scheme where multiple kernel buffer copies of the data packets are required. It should be noted that only the data path of the proxy is implemented in the kernel space for increased efficiency. The controlling application (control path), which listens for content requests and manages the multicast-to-unicast data conversion process, continues to run in the user space.

If the session is forwarded to only one client, the received packets can be directly modified without making any data copies. If the packets of the session need to be forwarded to multiple clients, it is assumed that the network interface card supports a scatter/gather operation, which allows a data packet to be stored in non-contiguous buffer space. For each client, memory for packet headers (link layer header, network layer header, transport layer header, session/presentation layer header) is allocated and the payload data with the originally received packets is shared. This not only reduces memory requirement, but also saves the processor intensive data copy operation. Moreover, if a transport layer checksum is required, as is the case with UDP, the checksum for shared payload data can also be shared and the checksum in the UDP header for each client can be updated.

Figure 4:
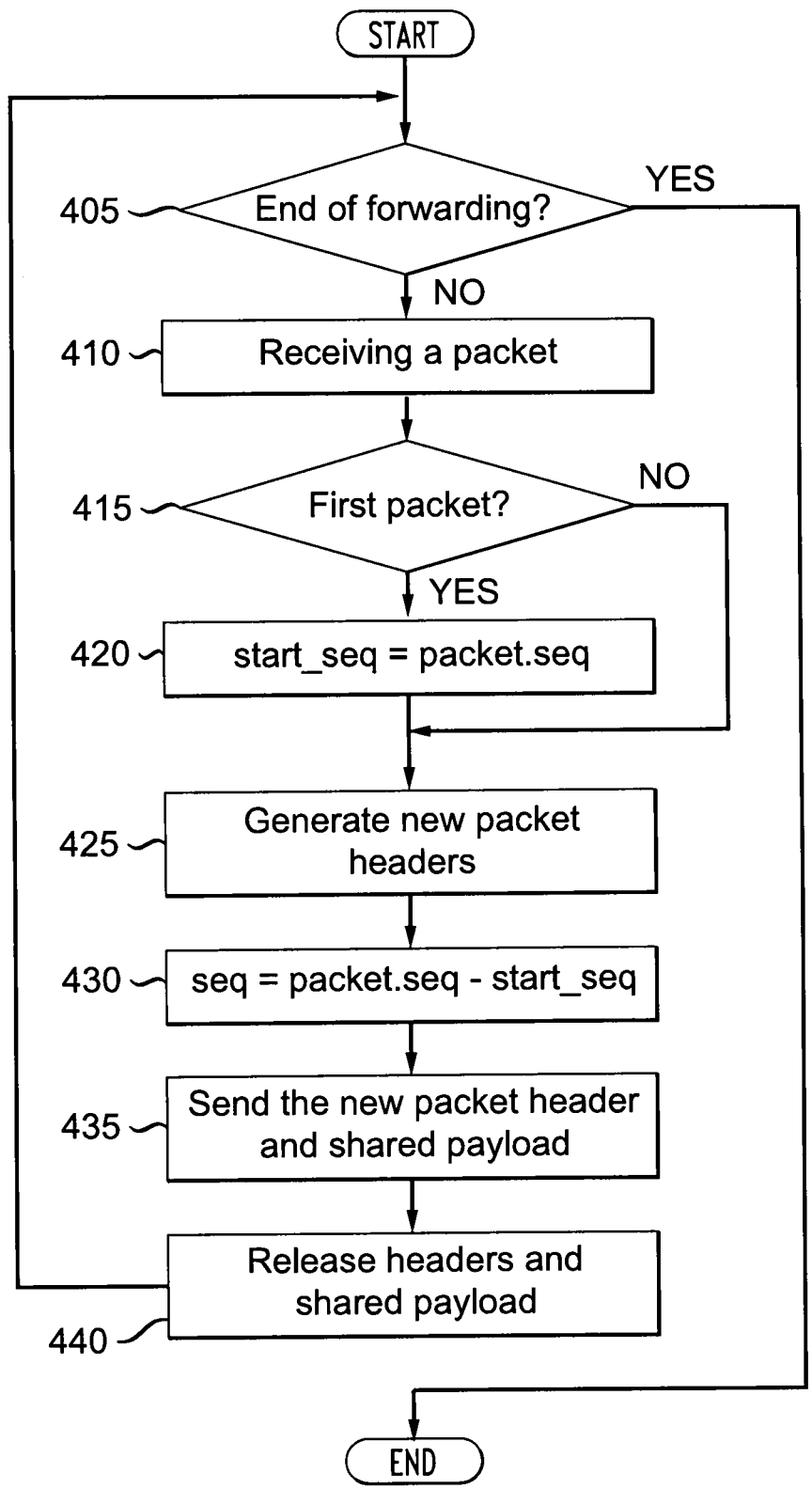
FIG. 4 is a flowchart of the multicast-to-unicast conversion process of the present invention.

When the client uses RTSP to request the desired content stream, the controlling application (proxy) on the home gateway will first generate a Session Description Protocol (SDP) file with all the parameters set according to the current session. SDP generation is necessary provided the client uses RTSP to make the request. An HTTP GET request or any other proprietary mechanism could also be used, which would not require the generation of an SDP file. The SDP generation is part of the control path that is handled in the proxy application (user space). FIG. 4 (described below) depicts the data path in the kernel space.

Then the controlling application notifies the kernel data path to forward data packets to the newly created session. In the RTSP response, the starting sequence number should be returned to the client. Without knowing what the sequence number of next incoming packet is, the kernel data path will use the sequence number of the first incoming packet as the starting sequence and subtract it from all subsequent packet sequence numbers. Therefore, in the RTSP response, the controlling application 0 can be used as the starting sequence.

FIG. 4 is a flowchart of the multicast-to-unicast conversion process in the controlling application (proxy) of the home gateway of the present invention. At 405 the proxy performs a test to determine if forwarding has ended. If forwarding has ended, then processing ends. If forwarding has not ended, then at 410 the proxy receives a data packet of the requested content and stores (saves, buffers) the received data packet as shared payload (data). The received data packet includes a data packet header. At 415 the proxy performs a test to determine if the received data packet (of the requested content) is the first data packet. If the received data packet (of the requested content) is the first data packet, then at 420 the starting sequence number is set to the sequence number of the first data packet. At 425, the proxy generates new data packet headers. At 430 the sequence number of the current data packet is determined (calculated) by subtracting the starting sequence number from the data packet sequence number. The sequence number is inserted into (modifies) the new data packet headers. At 435 the proxy sends the new data packet header and the shared payload to the end device in unicast. The original data packet headers are not unicast. That is, the shared payload (excluding the original data packet header) and the new data packet header is unicast. At 440 the proxy releases the memory (buffer) space allocated to the headers and shared payload. The proxy releases the memory (buffer) space allocated to the headers and the shared payload even if there has been no ACK from the end device. This is because the data packets are IP data packets and retransmission based recovery occurs based on MAC/Ethernet frames and is typically handled inside the Ethernet driver/firmware. If the received data packet (of the requested content) is not the first data packet, then processing proceeds to 425.

When the client pauses the session using a RTSP PAUSE command, the controlling application will notify the data path to stop forwarding packets for this session. Packet forwarding is restarted when the controlling application receives RTSP PLAY command from the client.

Figure 5:
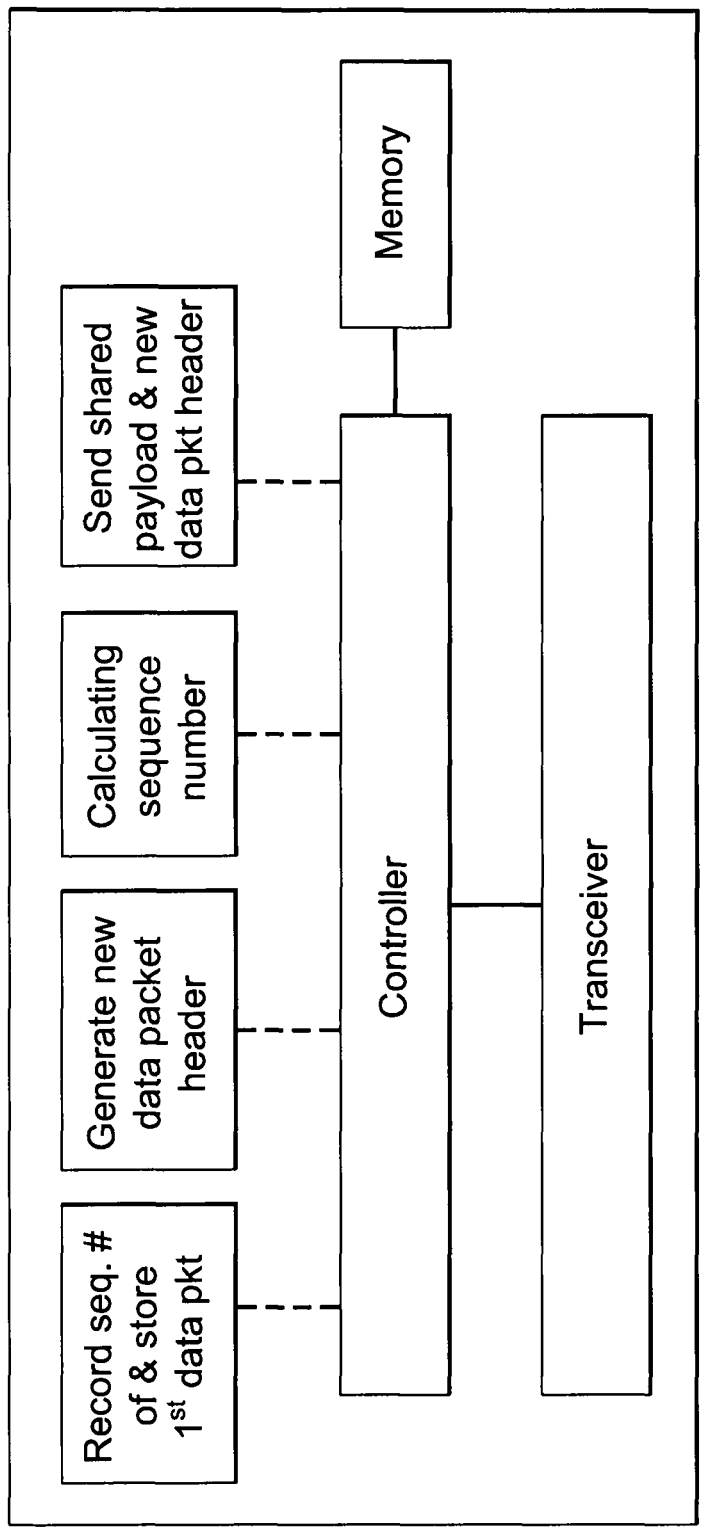
FIG. 5 is a block diagram of an exemplary apparatus in accordance with the principles of the present invention.

FIG. 5 is a block diagram of an exemplary apparatus in accordance with the principles of the present invention. The transceiver actually transmits and receives data and any control signals and the controller controls logic that performs all other functions. Specifically, the transceiver receives a new data packet and unicasts the shared payload and the new data packet header to a plurality of client devices. The original data packet headers are not unicast. That is, the shared payload (excluding the original data packet header) and the new data packet header is unicast. The controller controls means for determining if the received data packet is a first data packet including recording the sequence number of the first data packet and storing the received data packet as shared payload, means for generating a new data packet header and means for calculating a sequence number for the received data packet using a sequence starting number. The controller also includes means for initializing a sequence starting number and means for releasing said memory allocated to the packet headers.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for multicast to unicast conversion at a home gateway, said method comprising:
    receiving a data packet having a first data packet header at a proxy on said home gateway;
    intercepting, by said proxy, said data packet;
    storing, by said proxy, said received data packet as shared payload in kernel space;
    determining, by said proxy, if said received data packet is a first data packet;
    initializing, by said proxy, a sequence starting number if said received data packet is said first data packet;
    generating, by said proxy, a second data packet header;
    calculating, by said proxy, a sequence number for said received data packet using said sequence starting number;
    inserting, by said proxy, said sequence number into said second data packet header; and
    unicasting, by said proxy, said second data packet header and said shared payload excluding said first data packet header to a plurality of client devices.

2. The method according to claim 1, further comprising releasing, by said proxy, said kernel space allocated to said second data packet header.

3. The method according to claim 1, further comprising determining, by said proxy, if forwarding of data packets has ended.

4. An apparatus for multicast to unicast conversion, comprising:
    means for receiving a data packet having a first data packet header;
    means for intercepting, by said proxy, said data packet;
    means for storing said received data packet as shared payload in kernel space;
    means for determining if said received data packet is a first data packet;
    means for initializing a sequence starting number if said received data packet is said first data packet;
    means for generating a second data packet header;
    means for calculating a sequence number for said received data packet using said sequence starting number;
    means for inserting said sequence number into said second data packet header; and
    means for unicasting said second data packet header and said shared payload excluding said first data packet header to a plurality of client devices, wherein said apparatus is a home gateway having a proxy executed thereon.

5. The apparatus according to claim 4, further comprising means for releasing said kernel space allocated to said second data packet header.

6. The apparatus according to claim 4, further comprising means for determining if forwarding of data packets has ended.

7. A home gateway apparatus for multicast to unicast conversion, the apparatus comprising:
- a transceiver for receiving a data packet having a first data packet header;
- a controller, acting as a proxy, that interceps and stores said received data packet as shared payload in kernel space, the controller acts to determine if said received data packet is a first data packet, initialize a sequence starting number if said received data packet is said first data packet, generate a second data packet header, calculate a sequence number for said received data packet using said sequence starting number, and insert said sequence number into said second data packet header;
- wherein the transceiver acts to unicast transmit said second data packet header and said shared payload excluding said first data packet header to a plurality of client devices.

8. The home gateway apparatus according to claim 7, wherein the controller further acts to release said kernel space allocated to said second data packet header.

9. The home gateway apparatus according to claim 7, wherein the controller further acts to determine if forwarding of data packets has ended.

* * * * *